Aug. 30, 1949.        R. F. ROPER        2,480,510
MOTOR VEHICLE AIR CONDITIONING APPARATUS
Filed May 19, 1945        4 Sheets-Sheet 1

Inventor
Richard F. Roper
By Cushman, Darby & Cushman
Attorney

Aug. 30, 1949.  R. F. ROPER  2,480,510
MOTOR VEHICLE AIR CONDITIONING APPARATUS
Filed May 19, 1945  4 Sheets-Sheet 2

Inventor
Richard F. Roper
By Cushman, Darby & Cushman
Attorney

Aug. 30, 1949.  R. F. ROPER  2,480,510
MOTOR VEHICLE AIR CONDITIONING APPARATUS
Filed May 19, 1945  4 Sheets-Sheet 3

Inventor
Richard F. Roper
By Cushman, Darby & Cushman
Attorney

Aug. 30, 1949.　　　　R. F. ROPER　　　　2,480,510
MOTOR VEHICLE AIR CONDITIONING APPARATUS
Filed May 19, 1945　　　　　　　　　　　4 Sheets-Sheet 4

Inventor
Richard F. Roper

By Cushman Darby & Cushman
Attorney

Patented Aug. 30, 1949

2,480,510

UNITED STATES PATENT OFFICE 2,480,510

MOTOR VEHICLE AIR CONDITIONING APPARATUS

Richard F. Roper, Washington, D. C.

Application May 19, 1945, Serial No. 594,609

14 Claims. (Cl. 62—129)

The present invention relates to air conditioning apparatus and, more particularly, to unit air conditioners of the portable type, adapted to be positioned in individual rooms in buildings, to cool, dehumidify and otherwise condition the air therein. The invention also has to do with air conditioning units of this type, particularly adapted to be installed in and used with passenger motor vehicles, to cool and condition the air in the interior, passenger space thereof.

One of the primary objects of the invention is to provide an air conditioning apparatus of increased capacity in a minimum of space, and to re-arrange the elements of the apparatus so that a casing or casings of minimum size may be employed. A further object of the invention is to provide novel casing means for a portable, unit air conditioner, which minimizes the space required within the room to be cooled and conditioned, and which is inherently pleasing in appearance as well as unusually efficient in use.

A further object of the invention is to so arrange the elements of an air conditioning apparatus that their relative positions contribute most effectively to efficient operation and inherently take advantage of thermo-dynamic effects in the system.

A further object of the invention is to provide novel means for removably mounting an air conditioning apparatus in the luggage compartment of a conventional motor vehicle.

Another important object is to provide a portable, unit air conditioner which may be driven by a small gasoline engine as the power plant thereof, or which may employ an electric motor, in substitution for the engine, if so desired.

A further object is to provide an apparatus of this type which is particularly adapted for export use, on a rental basis in foreign countries, where electric current supply is scarce and, where present, is of widely differing type from that used in this country, thereby making the use of standard electric motors of the kind used here, impractical. To this end, a small gasoline engine is provided as the prime mover. The apparatus has been designed to carry out a plan in accordance with which the units will be shipped to South America, for use on a rental basis during the summer months in the lands below the equator, when they would not be used in the Northern Hemisphere, and then shipped back to this country for use in the warm weather here, when they would not be used in the winter months in the Southern Hemisphere. Such a plan of merchandising has heretofore been impractical, because of the widely differing types of electric current supplied by the utilities in different South American countries and as compared to that used in the United States. By the substitution of a small gasoline engine, the plan is made entirely practical. Moreover, if the lessees in this country so desire, the gasoline engine may be removed, and a standard electric motor substituted, for use where current is readily available.

Other and further objects and advantages of the invention will be apparent to those skilled in the art from a consideration of the following description of the embodiments in the accompanying drawings, in which Figure 1 is a perspective view of an apparatus, looking toward the portion of the casing which is adapted to be positioned in the room.

Figure 1:
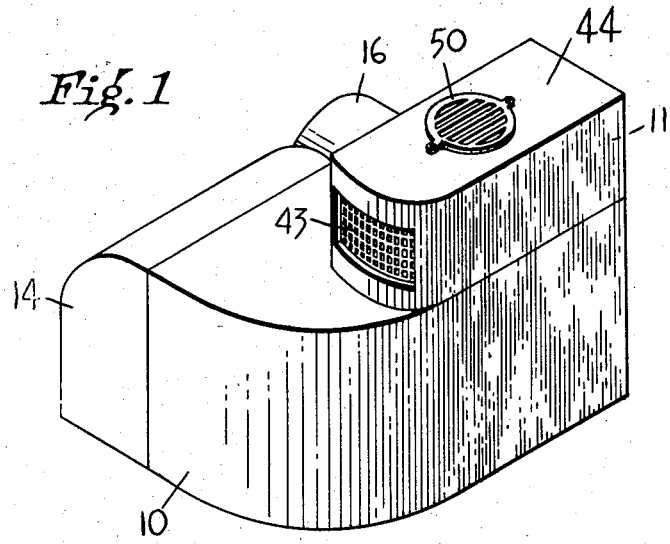

As shown in Figures 1–5, the casing for the air conditioner comprises a lower section 10 for the hot side of the refrigerating apparatus and an upper section 11 for the cold side. These sections may be separately fabricated and secured together by any appropriate means, or may be unitary in construction. The lower casing section, which houses the driving motor, the compressor and the condenser, is considerably larger than the upper section, which simply contains the evaporator and an indoor air circulating fan, as described below. By having the upper section smaller and positioned upon the lower section, the massive appearance of the apparatus is broken up, and an illusion of smallness is created. The upper section may be differently colored from the lower, if desired, to enhance this effect, and to make it appear that one small casing, no larger than a portable radio receiving set is positioned upon a cabinet associated with the window opening.

The various elements of the hot side of the refrigerating system are preferably mounted on a platform or chassis 12 removably supported by rubber bushings or the like upon the floor of the lower section of the casing and removable through the open, rear end thereof. A condenser 13, carried by the chassis projects upwardly therefrom, substantially filling one portion of the open rear end of the casing. The condenser is enclosed by a rearwardly projecting, downwardly opening hood 14, removably bolted or otherwise secured to the casing, to protect the condenser from the weather, and to provide a passageway for an upwardly flowing stream of condenser cooling air, circulated through the casing by a centrifugal fan 15, positioned within a fan housing 16, also bolted or otherwise secured to the rear end of the casing 10.

The fan is mounted upon a shaft 17, driven by a small, air cooled gasoline engine 18 mounted on the chassis 12 and adapted to drive a compressor 19 by means of a V-belt 20, trained about pulleys 21, 22 on the crank shaft of the engine and on the driving shaft of the compressor, respectively.

The engine is provided with a combined generator and starter motor 23, of well-known type, connected to the crank shaft by a chain or V-belt 24. The motor 23 may be employed to charge a storage battery, not shown, which serves as a source of power for starting and for normally driving the fan motor, hereinafter referred to, for circulating the indoor air through the evaporator, to be cooled and dehumidified.

Behind the condenser 13, and positioned angularly with respect thereto, there is a supplemental condenser 30, in series with the first-mentioned condenser, and adapted to deliver refrigerant to a receiver 31, from which the refrigerant flows through an expansion valve, in the usual manner, to the evaporators. The particular way in which the supplemental condenser 30 is positioned, to receive the full benefit of the condenser cooling air stream, without unduly obstructing its flow, is important.

The fan housing 16, secured to a plate 32, bolted or otherwise secured to the rear, open end of the casing 10, is provided with an axial inlet 33 and a tangential downwardly directed discharge conduit 34, the major portion of the housing being scroll-shaped, as at 35. Air drawn through the opening 33 into the central portion of the fan rotor 15 is discharged radially and circumferentially by centrifugal force and impinges against the inner surface of the scroll portion 35, around which it flows until it is discharged downwardly through the conduit 34.

The exhaust gases from the gasoline engine 18 are discharged through a muffler 36, into the inlet opening 33 of the fan housing, with the result that they flow outwardly with the heated condenser cooling air.

It will be apparent that air will be drawn upwardly through the hood 14, and through the condenser 30 into the casing. The direction of air movement turns after passing through the condenser, and a portion thereof flows over the compressor 19 to cool it, while another portion flows through the supplemental condenser 30 and past the receiver 31. On its way to the inlet opening 33 of the fan housing, the air also passes over and around the gasoline engine 18 and maintains it in reasonably cool condition.

Around the inner surface of the scroll portion 35 of the fan housing, there is arranged, along a serpentine path, a tube 37 for hot refrigerant, leading from the compressor 19 to the condenser 13. Hence, the highly heated, compressed refrigerant passes first through a tube associated with the fan housing and in position to receive a strong blast of air discharged centrifugally by the fan rotor.

The lower portion of the scroll section 35, as indicated at 38, laterally of the discharge conduit 34, constitutes a trough for the reception of water, which may be evaporated by the heat of the refrigerant in the tube 37, thereby to reduce the refrigerant temperature. The water may be water of condensation collected by the evaporator and delivered to the trough, as hereinafter explained, or a separate source of supply may be provided, to maintain a substantial volume of water in the trough continuously, particularly in relatively dry places, where the humidity of the air is low and little, if any, moisture collects upon the evaporators.

The end walls 40, 41 of the evaporator casing 11 are preferably provided with openings 42, 43, and the top wall 44 is provided with a central opening 45. A fan 46, driven by an electric motor 47 draws indoor air inwardly through the end openings 42 and 43, then through the two evaporators 48, 49, and finally discharges the air upwardly through the opening 45. Above the latter opening there is a circular, rotatable adjustable louvre plate 50, adapted to deflect the air discharged by the fan laterally or forwardly, depending upon its rotational adjustment.

Figure 2:
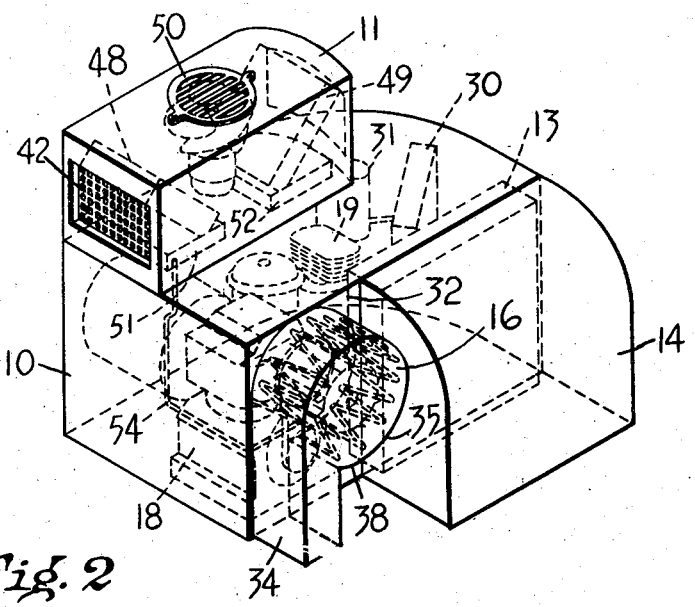
Figure 2 is a similar view, as seen from the other direction, with certain parts indicated in dotted lines.
Figure 3:
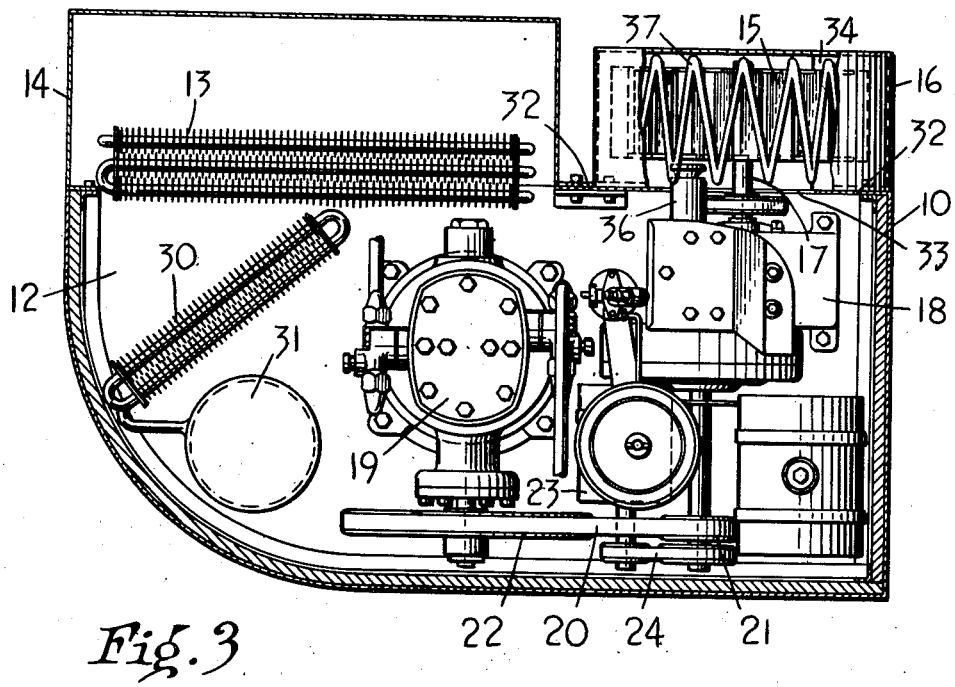
Figure 3 is a horizontal section and plan view, with certain parts broken away.
Figure 4:
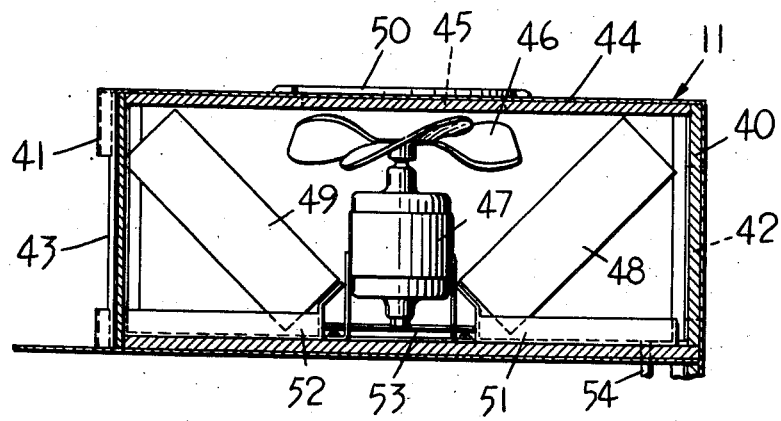
Figure 4 is a vertical section and through evaporator chamber.

As shown in Figures 2 and 4, the evaporators 48 and 49 are mounted on inclined planes, extending from the upper margins of the end wall openings to the floor of the upper casing 11, so that the air stream readily passes therethrough, as it changes its direction from the horizontal to the vertical. Moreover, by this arrangement, evaporators of larger dimensions and therefore of greater capacity may be positioned within a smaller casing.

Pans 51, 52, positioned below the evaporators collect water of condensation, condensed on the evaporator tubes and fins from the air flowing through the upper casing. A pipe 53 establishes communication between the two pans, and a drain pipe 54 leads through the floor of the upper casing and the top wall of the lower casing, to discharge into the trough 38, below the axial inlet 33 of the fan housing. Hence, the water of condensation is automatically delivered to the fan housing for evaporation therein. In the event that water collects more rapidly than can be evaporated, it will be discharged by the fan blades or by the stream of air flowing over its surface. It has been found in actual practice that large quantities of water can be disposed of in this manner since the fan and the air stream tend to distribute the water all the way around the inner surface of the scroll section 35, in contact with the tube 37, for evaporation by the heat thereof.

Figures 5, 6, 7:
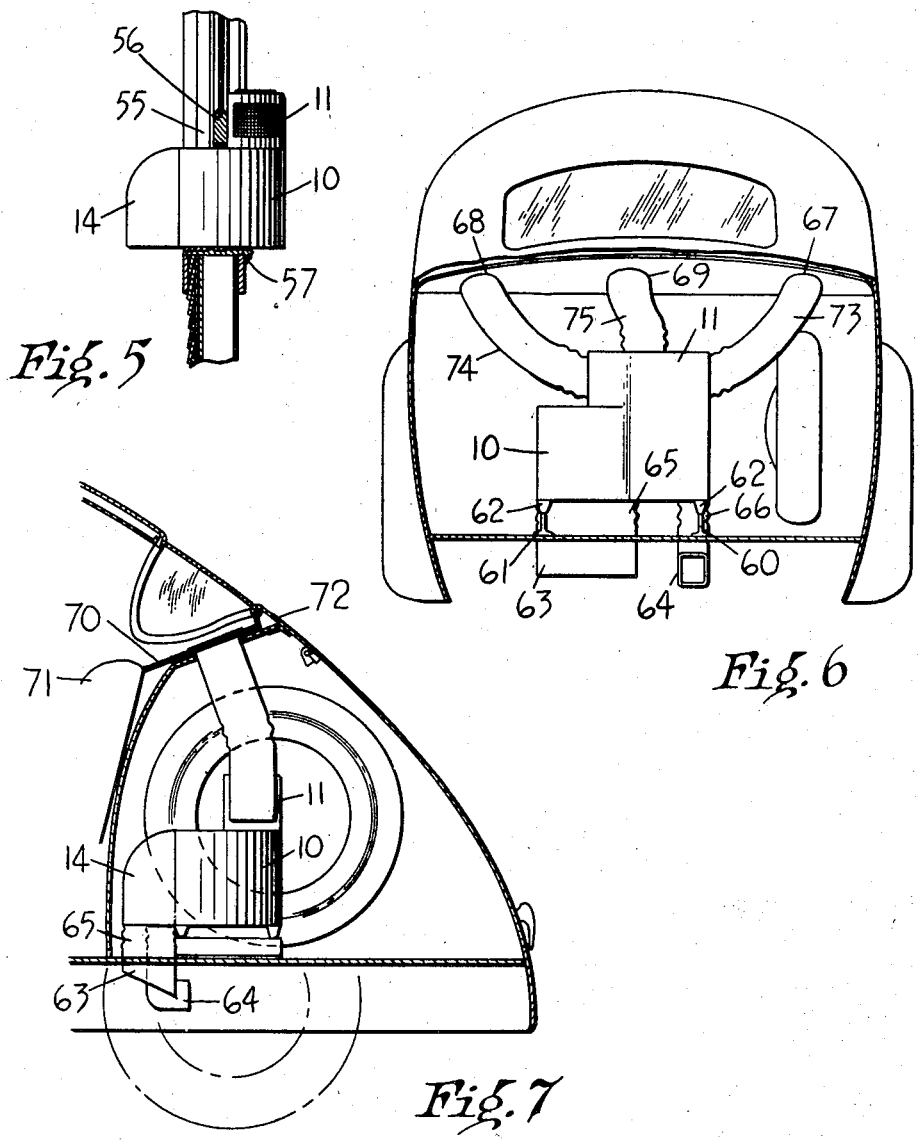
Figure 5 is an end view, on a reduced scale, showing the apparatus installed in a window opening.
Figure 6 is a rear view, in partial section, showing the installation of the unit in an automobile.
Figure 7 is a side view corresponding to Figure 6.

The apparatus of the present invention is adapted to be mounted, as shown in Figure 5, in a window opening 55, below the sash 56, and supported upon the sill 57. The upper casing 11 and the front portion of the lower casing 10 are positioned inwardly of the window line, while the rear portion of the latter, the hood 14 and the fan housing 16 are positioned outdoors, exteriorly of the building wall. Hence, condenser and compressor cooling air is drawn into the casing from the outdoors and again discharged outwardly, while indoor air, to be cooled and conditioned, is drawn inwardly through the end wall openings in the upper casing and discharged upwardly through the opening 45 and the adjustable distributing plate 50. This arrangement provides an ideal air circulating system, since the cold air, projected upwardly, tends to displace hot air in the upper portion of the room, which is then drawn into the casing to be cooled and again projected upwardly.

As shown in Figures 6 and 7, the apparatus of the present invention is particularly adapted to be installed in the rear luggage compartment of a motor vehicle. Preferably, two supporting rails 60, 61 are welded or bolted to the floor of the luggage compartment, to support the casing by means of rubber blocks 62 or the like. Also, openings are made in the floor of the compartment, for the reception of condenser and compressor cooling air ducts 63, 64, which may be secured in position, substantially permanently, by any appropriate means. It should be noted that the air intake duct 63 opens forwardly and is relatively wide, while the air discharge duct 64, which faces rearwardly, is relatively narrow, to conform in size, respectively, to the hood 14 and to the centrifugal fan housing discharge conduit 34.

The duct 63 may be connected to the hood 14 by a readily detachable, flexible, heavy canvas sleeve 65, while the discharge duct 64 is similarly connected to the discharge conduit 34 by a flexible, canvas sleeve 66. Hence, the outdoor air for cooling the compressor, the condenser, and the internal combustion engine in the lower casing 13 will be drawn upwardly and inwardly through conduit 64, sleeve 65, and hood 14, and will be discharged by the centrifugal fan through the fan housing conduit 34, the sleeve 66 and the rearwardly facing discharge pipe 64.

The air in the interior of the vehicle is preferably circulated to and from the evaporator casing through openings 67, 68, 69, formed in a panel 70, adapted to replace the panel conventionally employed in many types of automobile between the back of the rear seat and the streamlined stern portion 72 of the vehicle. The openings may be covered with appropriate grill work, and the panel 70 serves as a convenient means for supporting the control devices for the air conditioning apparatus.

Flexible conduits 73, 74 establish communication between the openings 67, 68 and the end wall openings 42, 43 in the evaporator casing 11. These conduits like the one mentioned above, may be flexible and readily detachable, and made from heavy canvas, reinforced if desired by metal rings or a continuous spring coil. Similarly, the opening 69 in the panel may be connected to the top wall opening 45 in the evaporator casing 11 by a flexible conduit 75.

From the above, it will be understood that air in the interior of the vehicle will be drawn downwardly through openings 67 and 68 in the panel 70 into the evaporator chamber 11, and through the evaporator. It will be cooled and dehumidified by this circulation, and discharged back into the interior of the vehicle through the top opening in the casing, the conduit 75 and the opening 69.

When it is desired to remove the air conditioning unit from the vehicle, for service or repair, or for storage or shipment to other parts of the world during winter months, it is simply necessary to disconnect the flexible sleeves or conduits 65, 66, 73, 74 and 75 and remove the unit from the luggage compartment. The several openings may be closed, if desired, by the use of suitable closure means.

Figure 9:
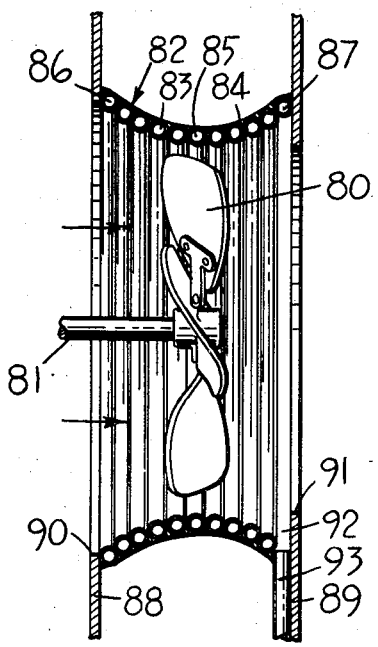
Figure 9 is a vertical section on line 9—9 of Figure 8.
Figure 8:
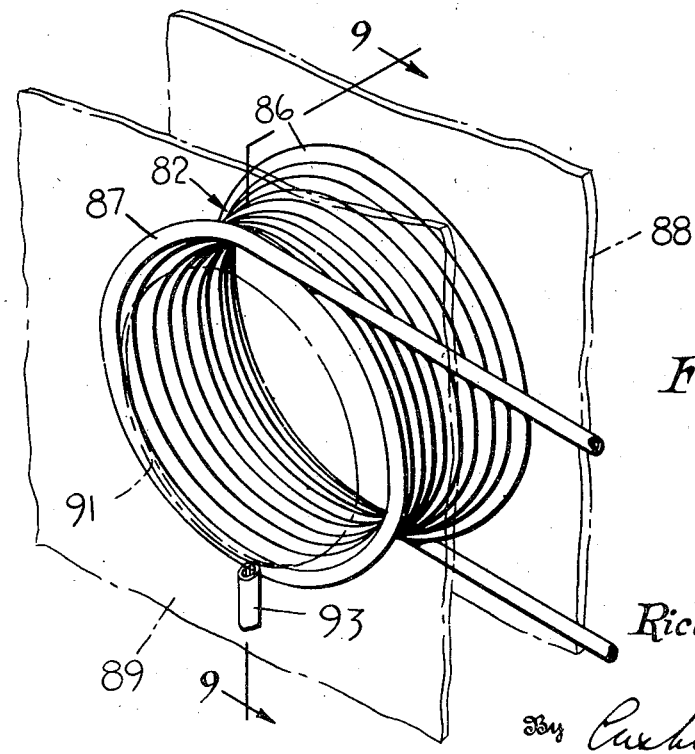
Figure 8 is a perspective view of a modified form of refrigerant cooler and fan shroud.

In Figures 8 and 9, a modified type of fan and fan housing is disclosed. In this case, a conventional propeller type fan 80, mounted on a shaft 81 is disposed within a shroud 82, formed by a continuous coil of tubing 83. The successive convolutions are secured to each other, as by solder 84. It will be noted that the diameters of the successive convolutions increase progressively in both directions from a minimum at the mid-plane, as indicated at 85 to a maximum in the inner and outer ends 86, 87. Plates 88, 89, constituting part of the casing means for the shroud, are provided with circular openings 90, 91, the former being equal in size to the diameter of the largest convolution and the latter being of the same diameter as the smallest convolution, at the center. The space 92, inwardly of the discharge opening 91, behind the plate 89, constitutes a trough for the reception of water of condensation delivered by a pipe 93 from the associated evaporator, or for cooling water delivered by said pipe from any other source. It will be noted that the form of the shroud 82 is generally that of a venturi and that its walls are constituted by a conduit for hot refrigerant, so that the maximum cooling effect is produced.

Figure 10:
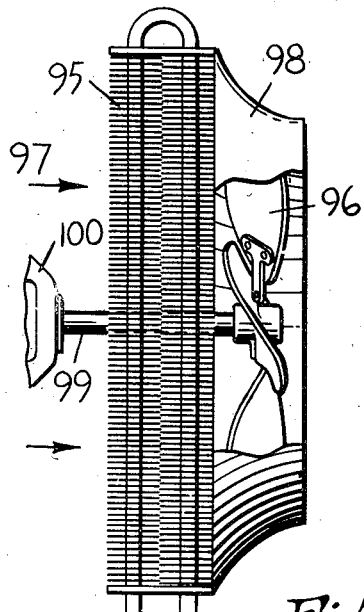
Figure 10 is a modified form of evaporator.

As shown in Figure 10, a somewhat similar arrangement of Venturi-shaped shroud may be employed in combination with an evaporator 95, and an exteriorly positioned suction fan 96, adapted to draw air from the interior of the casing, as indicated at 97, through the evaporator, for discharge into the room. A Venturi-shaped shroud 98, surrounding the fan 96 may be carried by the evaporator 95 or by the casing in which it is positioned. The fan shaft 99 extends from the motor 100 through an appropriate opening in the evaporator to the outside, where the fan is mounted. It has been found that this arrangement provided an extremely efficient and quiet indoor air circulating system for room coolers, since the air is not blown by the fan directly against evaporator surfaces or grill work, but is drawn by suction through the evaporator and discharged, unimpeded, directly into the room.

Although the present invention has been described with considerable particularity in this specification, by reference to the embodiments shown in the accompanying drawings, it must be understood that it is not limited to the details of construction shown and described, but includes all modifications coming within the scope of the appended claims and their equivalents.

I claim:

1. An air conditioning apparatus comprising a casing having a rear end wall open to external atmosphere, a condenser associated with said rear wall, a compressor and a prime mover including a driving shaft in the casing, a centrifugal fan housing positioned exteriorly of said rear wall having an axial inlet and a downwardly directed peripheral discharge opening, said housing providing a trough in the bottom thereof, below and laterally of the discharge opening, a centrifugal fan on said driving shaft in the casing, a conduit for hot refrigerant leading from the compressor to the condenser and including a section associated with said fan housing and in heat exchange relation to said trough, and means for delivering water to the trough for evaporation by the heat of the refrigerant in said conduit.

2. An air cooling and conditioning unit comprising casing means defining a chamber for the hot side of a refrigerating system, the chamber having openings in its rear wall, a condenser substantially filling one opening, a centrifugal fan and fan housing positioned exteriorly of the other opening, a compressor in the casing, a prime mover for the compressor and the fan, and a conduit for hot refrigerant leading from the compressor to the condenser and including a section disposed in heat exchange relation to the fan housing and to the air discharged centrifugally against its surfaces by the fan.

3. An air cooling and conditioning unit comprising casing means defining a chamber for the hot side of a refrigerating system, the chamber having openings in its rear wall, a condenser substantially filling one opening, a centrifugal fan and fan housing positioned exteriorly of the other opening, a compressor in the casing, a prime mover having a drive shaft connected to the compressor, a centrifugal fan in said housing on said shaft, and a conduit for hot refrigerant leading from the compressor to the condenser and including a section extending along a serpentine path arranged circumferentially around the inner surface of the fan housing in position to be contacted directly by the air discharged centrifugally by the fan.

4. An air cooling and conditioning unit comprising casing means defining lower and upper chambers isolated from each other for the hot and cold sides of a refrigerating system, the lower chamber having openings in its rear wall, a condenser substantially filling one opening, a centrifugal fan and fan housing positioned exteriorly of the other opening, said fan housing having an axial inlet and a tangentially disposed, downwardly directed discharge passage and a trough at the bottom of the housing laterally of the discharge passage, a compressor in the lower chamber, a conduit for hot refrigerant leading from the compressor to the condenser and including a section disposed in heat exchange relation to the housing and said trough, evaporator means in the upper chamber, and a conduit for water of condensation leading therefrom to said trough.

5. An air cooling and conditioning apparatus comprising a casing having openings in its rear wall, a condenser substantially filling one opening and extending outwardly therebeyond, a centrifugal fan and fan housing disposed exteriorly of another opening and adapted to draw air through the first-mentioned opening, the condenser and the casing, axially into the housing and to discharge the same tangentially therefrom in a downward direction, a compressor in the casing, a prime mover for the compressor and the fan, and a supplemental angularly disposed condenser positioned between the first-mentioned condenser and the compressor, in the path of the air flowing through the casing.

6. An air conditioning unit comprising a casing having openings in its end walls and a central opening in its top wall, a pair of evaporators in the casing, disposed on upwardly diverging inclined planes behind the end wall openings, and a fan and fan motor in the casing in the space between the two evaporators, below the top wall opening and adapted to draw air inwardly through the end wall openings and the evaporators and to discharge the same upwardly through the top wall opening.

7. In an air conditioning apparatus, an evaporator casing having openings in its end walls communicating with the room to be cooled, evaporators in the casing substantially co-extensive in width therewith positioned behind the openings and inclined downwardly from the upper margins of the end wall openings to the floor of the casing, and a fan in the space between the evaporators for drawing air inwardly through the end wall openings and the evaporators and for discharging the same into the room.

8. An air conditioning apparatus comprising a casing, a compressor and refrigerant condenser therein, a fan for circulating air into the casing over the condenser and the compressor and out of the casing, a gasoline engine prime mover in the casing, and a muffler therefor, disposed to discharge the exhaust gases into the air stream propelled from the casing by the fan.

9. An air conditioning apparatus comprising a casing, a compressor and refrigerant condenser therein, a centrifugal fan and fan housing associated with said casing for drawing condenser cooling air through the condenser and into the casing, said fan housing having an axial inlet and a peripheral discharge, a gasoline engine in the casing for driving the compressor, and an exhaust muffler for the engine arranged to deliver exhaust gases to said axial inlet for discharge from the casing with the outgoing condenser cooling air stream.

10. An air conditioning unit for use with a motor vehicle having a passenger seat, a panel therebehind having openings therein, and a luggage compartment below the panel, said unit being adapted to be positioned in said compartment and comprising a casing having openings in its opposite side walls and another opening in its top wall, evaporator means in the casing, a pair of ducts connected to openings in said panel adjacent the opposite ends thereof and to the side wall casing openings, another duct connected to a central opening in the panel and to the casing top wall opening, and air circulating means in said casing arranged to draw air from the vehicle interior through the first mentioned panel openings into the casing, past the evaporator means and to discharge the same through the casing top wall opening and the central panel opening.

11. An air conditioning unit for use with a motor vehicle having a passenger seat, a panel behind said seat spanning the space between the seat and the body walls, and a luggage compartment below the panel, said unit comprising casing means defining lower and upper chambers for the hot and cold sides of a refrigerating system, a compressor, a condenser and an air circulating fan in the first chamber, ducts extending through the floor of said luggage compartment for the circulation of condenser and compressor cooling air through that chamber, an evaporator and a fan in the other chamber, and ducts leading through openings in said panel for the circulation of air from the interior of the vehicle through the second chamber and the evaporator and back into the vehicle.

12. An air conditioning apparatus adapted to be positioned in the rear luggage compartment of a vehicle, comprising a casing, a refrigerant compressor and condenser in the casing, air circulating means, ducts extending through the floor of the luggage compartment below the vehicle, and flexible connections between said ducts and the casing, for the circulation of condenser cooling air therethrough.

13. An air conditioning apparatus adapted to be positioned in the rear luggage compartment of a motor vehicle, comprising a casing having openings in one of its walls, a condenser substantially filling one of said openings, a downwardly opening hood disposed exteriorly of the casing and covering the last mentioned opening, a centrifugal fan housing disposed exteriorly of the other opening and having an axial inlet and a downwardly directed peripheral discharge passage, a fan in said housing, a compressor in the casing, a gasoline engine prime mover for the compressor, a forwardly facing conduit extending through the floor of the luggage compartment and connected to the hood, and a rearwardly facing conduit extending through said floor and connected to the fan housing discharge passage.

14. An apparatus in accordance with claim 13 characterized in that the connections between said conduits and the hood and discharge passage, respectively, are flexible detachable connections, facilitating removal of the casing without removal of the conduits.

RICHARD F. ROPER.

REFERENCES CITED

The following references are of record in the file of this patent:

UNITED STATES PATENTS

| Number | Name | Date |
| --- | --- | --- |
| 2,044,832 | Child | June 23, 1936 |
| 2,053,206 | Sargent | Sept. 1, 1936 |
| 2,115,294 | Woodruff | Apr. 26, 1938 |
| 2,198,500 | Jewell | Apr. 23, 1940 |
| 2,283,928 | Huggins | May 26, 1942 |
| 2,294,036 | Kettering | Aug. 25, 1942 |
| 2,299,527 | Cody | Oct. 20, 1942 |
| 2,303,857 | Numero | Dec. 1, 1942 |
| 2,317,104 | Moore | Apr. 20, 1943 |
| 2,349,059 | Terry | May 16, 1944 |
| 2,359,051 | Roper | Sept. 26, 1944 |
| 2,386,883 | Ames | Oct. 16, 1945 |